Sept. 2, 1924.
J. F. CYPHERS
1,507,108
PROCESS AND APPARATUS FOR THE CONTINUOUS DISTILLATION OF ALCOHOL
Filed Sept. 21, 1923
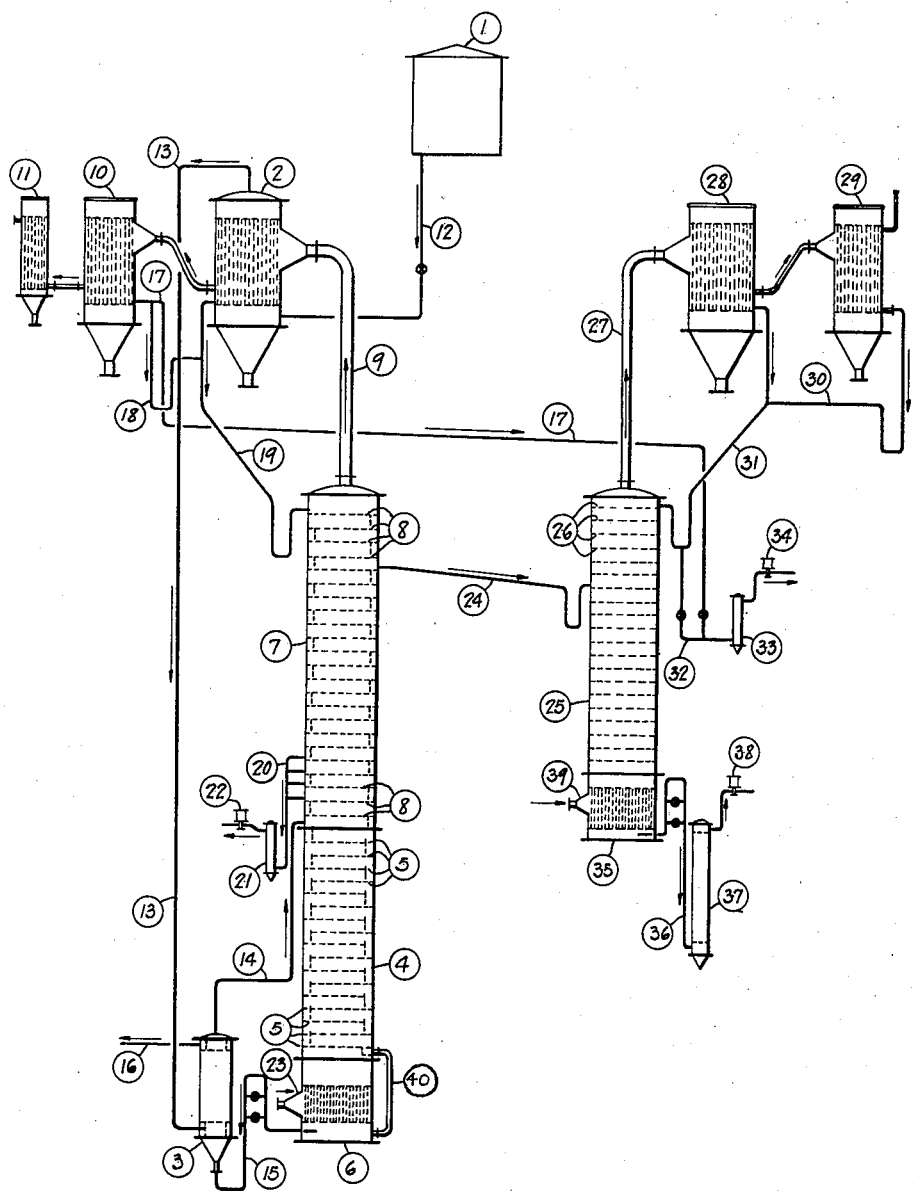
INVENTOR.
BY James F. Cyphers
Thomas Y. Clark
ATTORNEY.

Patented Sept. 2, 1924.

1,507,108

UNITED STATES PATENT OFFICE.

JAMES F. CYPHERS, OF BALTIMORE, MARYLAND.

PROCESS AND APPARATUS FOR THE CONTINUOUS DISTILLATION OF ALCOHOL.

Application filed September 21, 1923. Serial No. 664,113.

*To all whom it may concern:*

Be it known that I, JAMES F. CYPHERS, a citizen of the United States, residing in Baltimore, in the State of Maryland, have invented new and useful Improvements in Processes and Apparatus for the Continuous Distillation of Alcohol, of which the following is a specification.

This invention relates to a method and apparatus for use in the continuous distillation and rectification of alcohol.

In ordinary alcoholic fermentation many bodies besides ethyl alcohol are produced, some being higher boiling than ethyl alcohol, as amyl alcohol, the group often being termed fusel oils and in the art called "high boilers" or "tails", and others, having a lower boiling point, as the aldehydes and ethers and called in the art, "low boilers" or "heads". These impurities are customarily separated by successive distillations and condensations until a reasonably pure alcohol is obtained.

It is the object of the present invention to carry on the successive distillations simultaneously, to concentrate the various impurities and to remove them from the alcohol at the points of their concentration, to conserve the heat to the utmost, to use as little water as possible, to dilute the products as little as possible, and to make the separations of the impurities as complete as possible, thus producing a high proof alcohol substantially free from impurities other than water direct from the fermented mash.

In carrying out my invention, the crude alcoholic liquors are heated by alcoholic vapors and then by the exhausted liquors, and the alcoholic liquors are passed into the middle of a rectifying still, in which advancing alcoholic vapors progressively becoming more pure are brought into contact with descending exhausted liquors, progressively becoming more exhausted. This process is repeated with alcoholic vapors being brought into similar contact with high boiling impurities, then vaporous low boiling impurities into similar contact with liquid alcohol, the final alcohol being nearly pure and the amount of alcohol lost in removing the impurities being reduced to a minimum.

Further objects of my invention will be apparent from the following detailed description thereof.

While my invention is capable of being carried out in many different ways, for the purpose of illustration I have shown only one form of apparatus in the accompanying drawing, in which:

The figure is a diagrammatic representation of an apparatus which may be used in carrying out my invention.

The beer, fermented mash, or crude alcoholic liquors after having been made from any suitable substances is fed from the fermenter by a pump to the tank 1 which is maintained at a constant level in order to furnish a constant head of liquors. From this tank liquors flow through pipe 12, through beer preheater 2, flowing through the pipes therein. The cover of the preheater is of the removable type to permit ready cleansing of the tubes, and the sediment can be flushed out at the bottom of the preheater. The other condensers are of similar construction. The liquors flow from the top of the preheater through pipe 13, through the tube nest in final beer heater 3, and through pipe 14 to the bottom of the rectifying section 7 of the column still. In section 7 of said still are rectifying plates 8 and in the lower part of the still, the beer plate section 4, are beer plates 5. At the bottom of the still there is a heater 23, the arrow showing the direction of the steam flow. This heater may be a closed one as shown, should pure water be scarce, or should it be desirable not to dilute the spent liquors or slop, or it may be an open one which permits steam to flow up into the column. There is a take-off 40 from the bottom plate 5 to the bottom 6 of the still to prevent the spent liquors from passing through, or over, the heater 23. Heater 23 has a conventional exhaust which is not shown. The spent liquors pass out through pipe and manifold 15 through the final beer heater 3, passing outside the tubes, and through 16 to a container either for further treatment or to be discarded. The spent liquors flowing through 3 are very hot and heat the incoming liquors to a temperature approximately the same as that of the column still at the point of entrance.

The incoming liquors and vapors, coming into the bottom of 7, begin to give off the volatile fractions such as the low and high boiling impurities and the alcohol. The less volatile fractions or those boiling only at a very high temperature, run down over the plates 5 and, as they descend, they become hotter, and give up practically all of the low and high boilers and alcohol in them, and these vapors bubble up through the oncoming liquors. Thus the liquid becomes progressively weak in alcohol, and its accompanying impurities, as it descends, and the vapors become progressively rich.

The vapors from 4 pass up through the incoming liquors at the liquor inlet, into 7. In 7 the alcoholic vapors and their accompanying impurities are met by a descending alcoholic stream containing high boilers nearly all of which condense in 7 due to the decreasing temperature toward the top of 7, which stream becomes progressively rich in high boilers as it descends and progressively poor in alcohol and low boilers.

The high boilers arising in the vapors and descending in the liquid concentrate just above the liquor inlet, because the temperature above there allows them to condense, and the temperature below vaporizes them. At this zone or point of their greatest concentration they are withdrawn through pipe 20 to liquid cooler 21 and tail box 22, at which point they may be tested and measured and then stored for use.

The ascending vapors in 7 pass through pipe 9 to preheater 2, passing around the tubes, where, by their heat, the incoming alcoholic liquors are heated, and by the coldness of those liquors, the alcoholic vapors are condensed. The condensate is returned to the top of 7 through 19. Some of the vapors failing to condense in 2, are condensed in 10, in which the vapor passes around the pipes and they are withdrawn through 18, then passing through 19 they are led back to 7.

A very small amount of the condensate which is rich in low boilers is withdrawn through 17 when the valve in 17 is opened. Non-condensible gases such as $CO_2$ and air are led to 11 and there they are devaporized and released to the atmosphere. Water cools 11 and 10, entering first at 11 and passing to 10, the water passing through the tubes. The water pipes are conventional and are not shown.

As the vapors ascend through 7, they become progressively rich in alcohol and low boiling impurities. After the alcoholic vapors reach the highest proof attainable, the low boilers begin to concentrate very rapidly. This characteristic is utilized by withdrawing a portion of the alcoholic liquid, about one-fourth, as soon as the high proof is reached and before the low boilers begin to concentrate.

Rectifying column 25 has a closed heater 39 at its base, which heater has a conventional steam outlet, not shown. Column 25 has the usual form of rectifying plates, as shown at 26. The heat in 39 is so regulated as to drive upward with alcoholic vapors the low boiling impurities, and there is an outlet at the bottom of the column for pure alcohol, which flows through manifold and pipe 36, through liquid cooler 37 to tail box 38, where it may be tested and measured, and then it is stored.

In column 25 the descending liquid becomes progressively pure and free from low boiling impurities, or heads, and the ascending vapors bubbling up through the layers of alcohol, become progressively concentrated with low boiling impurities.

The inlet pipe 24 joins column 25 at a point about one-fifth of the distance from the top, or stated otherwise, the number of plates above the inlet is to the number of plates below approximately as 1 is to 4. This location permits the low boiling impurities to be exhausted from the alcohol in the column below entrance pipe 24, so that substantially pure alcohol reaches the bottom and is withdrawn, while the plates above entrance pipe 24 cause the low boiling impurities to be rapidly concentrated for removal through pipe 27. More plates are required below 24 than above, because the exhaustion of the heads takes place much more slowly than their concentration.

The vapors of the low boiling impurities are taken off at 27, passed through dephlegmator 28, and the rest of the vapors through vent cooler 29, from which the non-condensible devaporized gases are allowed to escape. The condensates from the dephlegmator and vent cooler are collected through pipes 30 and 31, and a small proportion is drawn off through 32. Pipes 17 and 32 have a common outlet through liquid cooler 33 and tail box 34, from which they are removed for storage. Most of the condensate is returned to the top of 25, to furnish a descending liquid or reflux. Vent cooler 29 and dephlegmator 28 are cooled by water, the water first passing through 29, then 28, through conventional connections which are not shown.

The operation of my invention will be apparent from the foregoing description, and although the process and apparatus are illustrated as being used to make alcohol, they may be used to distill other liquids of similar fractionating characteristics.

Many changes in the apparatus may be made without departing from the spirit of my invention.

I claim:

1. A process of purifying alcohol which consists in passing alcoholic vapors against a descending alcoholic stream rich in high boiling impurities, passing the residual unvaporized impurities against a current of ascending impure alcoholic vapors, removing the high boiling impurities at the zone of their greatest concentration and removing the residual impurities below said zone, withdrawing alcohol liquid freed from high boiling impurities and passing the same against a current of ascending alcoholic vapors rich in low boiling impurities and removing the alcohol at the point of its greatest purity and passing the vapors containing the low boiling impurities against a descending stream of impure alcoholic liquid, and removing said low boiling impurities at the point of their greatest concentration, substantially as set forth.

2. The process of purifying alcohol which consists in separating out the low boiling and alcoholic fractions, drawing off the high boiling fraction, withdrawing part of the low boiling fraction and the alcoholic fraction in liquid form to a rectifying column, introducing the same at a point approximately one-fifth of the distance from the top of the column, exhausting the low boiling impurities from the alcoholic fraction below said point and concentrating the low boiling fraction above said point, substantially as set forth.

3. The process of purifying alcohol which consists in separating out the low boiling and alcoholic fractions, drawing off the high boiling fraction, withdrawing part of the low boiling fraction and the alcoholic fraction in liquid form to a rectifying column, introducing the same at a point intermediate between the ends of the column, exhausting the low boiling impurities from the alcoholic fraction below said point and concentrating the low boiling fraction above said point, substantially as set forth.

4. The process of purifying alcohol which consists in separating out the low boiling and alcoholic fractions in a column still, drawing off the high boiling fraction, withdrawing part of the low boiling fraction and the alcoholic fraction in liquid form at a short distance from the top of the still to a rectifying column, introducing the same at a point intermediate between the ends of the column, exhausting the low boiling impurities from the alcoholic fraction below said point and concentrating the low boiling fraction above said point, substantially as set forth.

5. The process of purifying alcohol which consists in forming concentrated alcoholic liquid freed from high boiling impurities, passing said liquid into a rectifying column, boiling out the vapors of low boiling impurities and removing the purified alcohol from the base of the column, substantially as set forth.

6. The process of purifying alcohol which consists in forming concentrated alcoholic liquid freed from high boiling impurities, passing said liquid into a rectifying column having a closed heater at its base, boiling out the vapors of low boiling impurities and removing the purified alcohol from the base of the column, substantially as set forth.

7. The process of purifying alcohol which consists in forming concentrated alcoholic liquid freed from high boiling impurities, passing said liquid into a rectifying column at a point approximately one-fifth of the distance from the top, boiling out the vapors of the low boiling impurities and removing the purified alcohol from the base of the column, substantially as set forth.

8. The process of purifying alcohol which consists in forming concentrated alcoholic liquid freed from high boiling impurities, passing said liquid into a rectifying column at a point approximately one-fifth of the distance from the top, said column having a closed heater at its base, boiling out the vapors of the low boiling impurities and removing the purified alcohol from the base of the column, substantially as set forth.

9. The process of purifying alcohol which consists in forming concentrated alcoholic liquid freed from high boiling impurities, passing said liquid into a rectifying column at a point approximately one-fifth of the distance from the top, boiling out the vapors of the low boiling impurities, condensing said vapors and returning part of the condensate to the top of the column, and removing the purified alcohol from the base of the column, substantially as set forth.

10. In combination, a column still, said still having a rectifying section, an outlet for high boiling impurities at the lower part of the rectifying section, a liquid take-off near the top of said section, and a rectifying column, said take-off being connected to said column intermediate between the ends thereof, substantially as set forth.

11. In combination, a column still, said still having a rectifying section, an outlet for high boiling impurities at the lower part of the rectifying section, and a take-off near the top of said section for removing liquid therefrom for further treatment, substantially as set forth.

12. In combination, a column still, said still having a rectifying section, a preheater, the heat-receiving section of which is connected with an outlet of said still, the incoming alcoholic liquors for said still passing through said preheater, an outlet for high boiling impurities at the lower part of the rectifying section of said still, and a take-off near the top of said section for removing liquid therefrom for further treatment, substantially as set forth.

13. In combination, a column still, said still having a beer plate section and a rectifying section, an inlet for alcoholic liquors at the bottom of the rectifying section, an outlet for high boiling impurities at the lower part of said rectifying section, but above said liquor inlet, and a take-off near the top of said rectifying section for removing liquid therefrom for further treatment, substantially as set forth.

14. In combination, a rectifying column, an inlet for alcoholic liquid freed from high boiling impurities, said inlet being approximately one-fifth of the distance from the top of said column, and an outlet at the top of said column for low boiling impurities, substantially as set forth.

15. In combination, a rectifying column, an inlet intermediate between the ends of said column for admitting alcoholic liquid freed from high boiling impurities, an outlet at the top of said column for low boiling impurities, and a closed heater at the bottom of said column, substantially as set forth.

16. In combination, a rectifying column, an inlet intermediate between the ends of said column for alcoholic liquid freed from high boiling impurities, an outlet at the top of said column for low boiling impurities, a condenser connected to said outlet for condensing said impurities, the outlet of said condenser being connected to the upper part of said column to return part of the condensate thereto, and an outlet for the rest of said condensate, substantially as set forth.

17. In combination, a rectifying column, an inlet for alcoholic liquid freed from high boiling impurities, said inlet being approximately one-fifth of the distance from the top of said column, a closed heater at the bottom of said column, an outlet at the top of said column for low boiling impurities, a condenser connected to said outlet for condensing said impurities, the outlet of the condenser being connected to the upper part of said column to return part of the condensate thereto, and an outlet for the rest of said condensate, substantially as set forth.

18. In combination, a column still, said still having a rectifying section, an outlet for high boiling impurities at the lower part of the rectifying section, a liquid take-off near the top of said section, an outlet for low boiling impurities at the top of said section, a rectifying column, said liquid take-off being connected to said column intermediate between the ends thereof, and an outlet for the remaining low boiling impurities at the top of said column, substantially as set forth.

19. In combination, a column still, said still having a beer plate section and a rectifying section, an inlet for alcoholic liquors at the bottom of the rectifying section, an outlet for high boiling impurities at the lower part of the rectifying section, a liquid take-off near the top of the rectifying section, a rectifying column, said liquid take-off being connected to said column intermediate between the ends thereof, a closed heater at the bottom of said column, an outlet at the top of said column for low boiling impurities, a condenser connected to said outlet for condensing said impurities, the outlet of the condenser being connected to the upper part of said column to return part of the condensate thereto, and an outlet for the rest of said condensate, substantially as set forth.

20. In combination, a rectifying column, an inlet intermediate between the ends of said column for admitting alcoholic liquid freed from high boiling impurities, an outlet at the top of said column for low boiling impurities, a closed heater at the bottom of said column and an outlet for purified alcohol at the bottom of said column, substantially as set forth.

JAMES F. CYPHERS.